United States Patent [19]

Krueger

[11] 4,444,370
[45] Apr. 24, 1984

[54] PIPE SUPPORT DEVICE

[76] Inventor: Guenther Krueger, 16 Bristol Cts., Berkeley Heights, N.J. 07922

[21] Appl. No.: 387,955

[22] Filed: Jun. 14, 1982

[51] Int. Cl.³ .............................................. F16L 3/08
[52] U.S. Cl. ................................... 248/74.1; 206/443
[58] Field of Search .................... 248/74, 68 CB, 67.5, 248/226.3, 230, 544, 547, 27.1, 68 R; 228/301; 206/443, 446, 593, 592

[56] References Cited

U.S. PATENT DOCUMENTS

| 3,856,244 | 12/1974 | Menshen | 248/68 CB |
| 3,894,782 | 7/1975 | Hug | 248/27.1 |
| 4,160,477 | 7/1979 | Roffler | 248/68 R |
| 4,202,520 | 5/1980 | Loos et al. | 248/68 CB |
| 4,262,869 | 4/1981 | Menshen | 248/74 R |
| 4,281,786 | 8/1981 | Krueger | 228/3.1 |

Primary Examiner—Ramon S. Britts
Assistant Examiner—Ramon O. Ramirez
Attorney, Agent, or Firm—William T. Hough

[57] ABSTRACT

In a preferred embodiment, four separate pipe support members are spaceable circumscribingly around a pipe to be supported, two mounted against one vise plate and a remaining two mounted against an opposing vise plate, with the vise plates compressed and held toward one-another by bolts extending through bolt holes in opposite ends of the respective vise plates, with the bolt at one end of the vise plate extending through bolt-mounting apertures of opposing ones of the pipe support members, and each pipe support member including in triangular arrangement with its bolt-mounting aperture recess-forming structures forming recesses mateable with corresponding triangularly-arranged opposing projections extending from the vise plate at each location of a supported pipe support member.

7 Claims, 5 Drawing Figures

PIPE SUPPORT DEVICE

This invention relates to an improved pipe support device.

BACKGROUND OF THE INVENTION

Prior to the present invention, pipe support structures have existed in which upper and lower mirror-image sections are held together in support of a pipe therebetween by two spaced-apart bolts, somewhat in the nature of the arrangement shown in FIG. 6 of U.S. Pat. No. 4,281,786, for example. While such arrangement is satisfactory for large as well as small pipe if the dimensions are completely accurate and as long as there is no major change in temperature of the pipe or other surrounding environment, it is not readily possible to commercially economically manufacture such parts with necessary precision as to result in an acceptable fit that would provide proper pipe support for pipes of large dimensions, such as for pipes of outside diameter of sixteen (16) inches or more ranging up to thirty (30) inches, for example. Moreover, the cost of a mold for such large dimensions is prohibitive in private industry. For the mounting of opposing pipe supports, it is desired that bolt-holes in the opposing plates, herein referred to as vise-plates, match-up with bolt-mounting holes in the supported pipe support members mounted between compressing plates; such has proven to be not possible for sizes supportable of pipes having an outside diameter of about sixteen inches or more. Also, for such large pipes, use of merely two opposing pipe supports require each support to be so large that it is bulky and difficult to handle, transport and store. Like, where such large supports are manufactured, the cost of material therein as well as the weight thereof are very large to an extend rendering them impracticable in private industry. Prior to the present invention, subdividing resulted in support problems, and cumbersom efforts to regain stability of a calibre found with smaller support members for pipes of small diameter. For example, Loos et al. U.S. Pat. No. 4,202,520 utilizes individual bolts 14 to anchor-together quarter-part separate members as shown in the FIG. 1 of that patent, and other such equivalent mechanisms requiring a plurality of separate and repeated attachments; the time and labor involved would be prohibitive, and the extent to which each and every latching-together would be tight and stable is highly questionable and suspect. It is sufficient to say that in the experience of the present professional inventor and manufacturer, prior art has not heretofore provided any acceptable solutions to the diverse problems noted above.

SUMMARY OF THE INVENTION

Objects of the invention include the overcoming of one or more difficulties and problems of the type discussed-above.

Another particular object is to obtain a pipe mounting support element of small dimensions utilizable to obtain stable mounting of pipes of large outside diameters.

Another object is to obtain a novel combination of elements for mounting pipes of large outside diameters by use of small molds and elements of small dimensions.

Another object is to achieve high degrees of precision in the fitting-together of elements of the pipe supporting combination.

Another object is to obtain a pipe support member and supporting plate thereof, intermeshable as to avoid twisting or pivoting of the support member in it mounting position, and to utilize the clamping pressure to enhance support against such potential pivoting.

Another object is to reduce cost of manufacture of pipe support elements and combination thereof, for the industry of large outside diameter pipes such as for the oil industry, for example.

Other objects become apparent from the preceding and following disclosure.

One or more objects of the invention are obtained by the invention as described hereinbelow and set-forth typically in the drawings, which drawings are for improving understanding but not intended to unduly limit the scope of the invention, the invention including other variations and modifications and equivalents obvious to a person of ordinary skill.

Broadly the invention is in the fact of a single unit herein referred to as a pipe support member that in a multiple of four identical ones thereof are stably braceable of a pipe having any outside diameter, but particularly valuable for pipe supporting of pipes having outside diameter of about sixteen inches or more, for example up to about thirty (30) inches. A preferred combination includes opposing mounting plates herein referred to as vice plates which when clamped together by spaced-apart bolts, results in a locking of the respective separate pipe support members, each of the four, each against its contacting vise plate, by virtue of the plate and the separate pipe support members having opposing meshing mateable projections and recesses thereby obviating any potential twisting of any one or more of the pipe support members. Moreover, the recesses and projections, respectively, extend in directions substantially parallel to the bolt-mounting aperture and throughchannel space thereof, for each bolt-mounting aperture of each pipe support member, with there preferably being at-least two such recesses and/or projections associated with each bolt-mounting aperture in a triangular arrangement resulting in sturdy and stable locking of the pipe support member against its compressing vise plate. The recesses and/or projections are positioned and arranged such that when the vise plates are opposingly compressed locking the pipe support members therebetween in their plate-supporting function, pressure against the outer circumscribing surface of the pipe results in further locking-pressure against the respective pipe support members with regard to the above-described locking mechanism.

By referring to the Figures, it can be appreciated that the four pipe support members circumscribing each pipe do not fully encompass the pipes outer circumference, and are accordingly much smaller.

By a manufacturer, it may be also appreciated that the same mold may be utilized for producing the pipe support members for many different pipes of varying outside diameters, the particular arc of the pipe-supporting surface being the sole dimension of the mold that must be switched for different pipe diameters, whereby a large savings is made in necessary capital investment. Also, the small sized pipe mounting member requires a nominal amount of molding matter.

Of particular importance is the fact that the locking mechanism against the potential twisting or pivoting of each pipe mounting member around each mounting bolt, is achieved by virtue of the recess and/or projection therein being spaced a mere small distance or dimension from the bolt-mounting aperture, and this dimension remains preferably constant for all of many different varying sizes of pipe mounting members (described-above) for pipes of different outside dimensions—whereby the accuracy and precision of fitting and interlocking of the recesses and/or projections opposingly on the opposing surfaces of the vise plate and the adjacent pipe support member remains constant and of high calibre, resulting in a constant and reliable stability in the mounting of pipes irrespective of their outside diameter.

The invention may be better understood by making reference to the following Figures illustrating typical and preferred embodiments of the invention.

THE FIGURES

Figure 1:
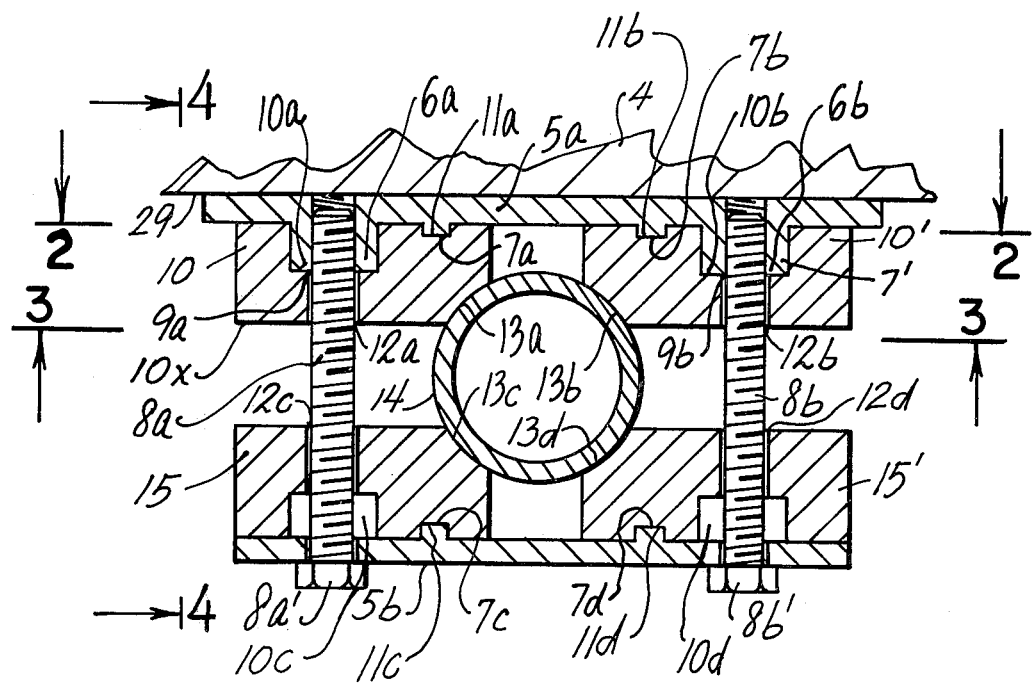
FIG. 1 illustrates a typical side cross-sectional view of the combination of multiple pipe support members and vise plates and compressing bolts, as mounted around a pipe's outer surface, in a side view thereof and transverse to the pipe's length, and with the upper vise plate welded to a supporting wall surface for example.
Figure 1A:
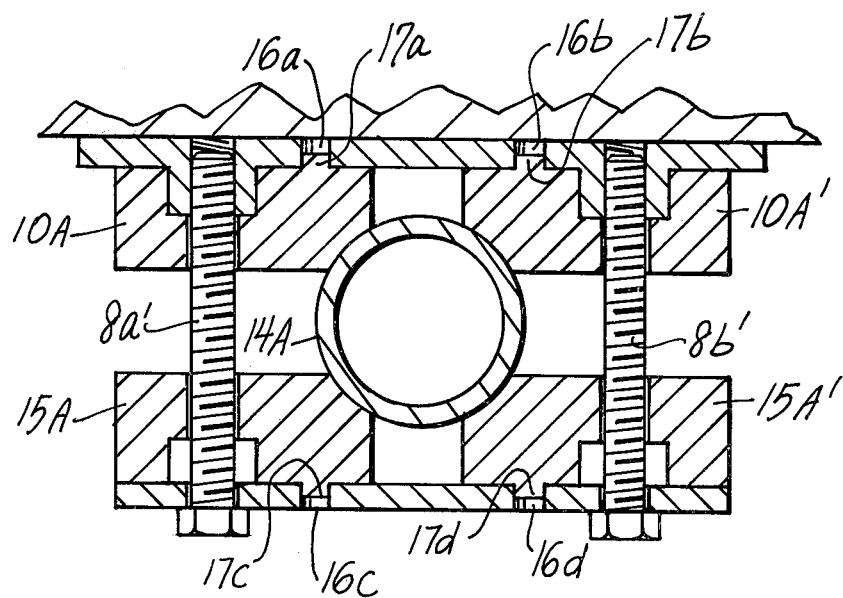
FIG. 1A is substantially identical to the FIG. 1 illustration, differing only in the recess or hole being in the vise plates rather than in the pipe support members, and the projections being from the surfaces of the pipe support members rather than from the vise plates.

The elements of FIG. 1A have numerals primarily as primes of indicia shown for FIG. 1, where labeled at all, being substantially identical except as previously noted; the differing elements has different indicia than FIG. 1. Thus, otherwise, the description of FIG. 1 substantially also describes the FIG. 1A alternate embodiment.

In FIG. 1, there is shown the supporting wall 4, the upper and lower vise plates 5a and 5b respectively, the upper pipe support members 10 and 10', and lower pipe support members 15 and 15', the mounting bolts 8a and 8b, the bolt-mounting female-threaded plate-mounted nuts 6a(fused to the plate typically) and 6b, the plate projections (tits) 7a, 7b, 7c, and 7d, the pipe support member-recesses 11a, 11b, 11c, and 11d, the bolt-receiving nut-openings (holes) 9a and 9b, the pipe support member-nut-receiving recesses (holes) 10a and 10b, 10c and 10d, the pipe support member-bolt-receiving holes 12a, 12b, 12c and 12d, the curve (arcuate) surfaces 13a, 13b, 13c, and 13d of the pipe support members, and the pipe 14.

FIG. 1A additionally shows an alternate embodiment having the reversed positioning of the mating recesses and projections of the pipe support members and vise plates, namely the plate apertures 16a, 16b, 16c, 16d, and pipe support member projections 17a, 17b, 17c, and 17d.

Figure 2:
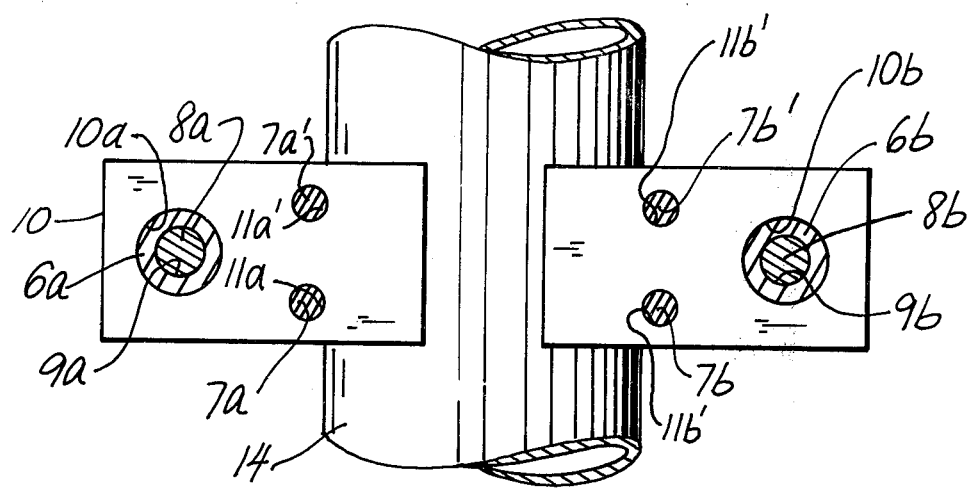
FIG. 2 illustrates a cross-sectional view as taken along the line 2—2 of FIG. 1.

FIG. 2 illustrates the FIG. 1 pipe support members 10 and 10' with cross-sections through the mounted-nuts 6a and 6b and the bolts 8a and 8b therein, and likewise with cross-sections through the plate-projections 7a, 7a', 7b, and 7b', noting that the recesses 11a, 11a', 11b, and 11b' and the plate projections mated therein are in triangular arrangements relative to the nut-receiving holes 10a and 10b, and the nuts mated-therein as nuts 6a and 6b.

Figure 3:
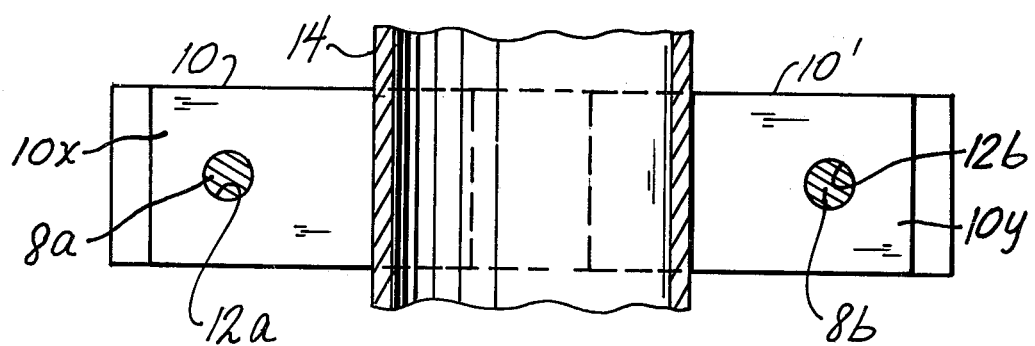
FIG. 3 illustrates a bottom plan view but cross-sectional through the pipe, as taken along line 3—3 of FIG. 1.

FIG. 3 as described as to its view previously, illustrates the bottom plan view taken along line 3—3 of FIG. 1, showing the cross-section of the bolts 12a and 12b and pipe 14 mounted against the pipe support members 10 and 10', the bottom surfaces being identified as 10x and 10y.

Figure 4:
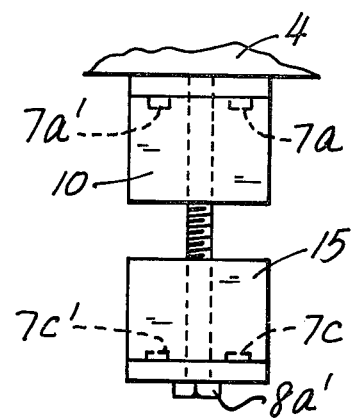
FIG. 4 illustrates a side or end view as taken along the line 4—4 of FIG. 1.

FIG. 4 illustrates members already described in FIG. 1, in a side or end view.

It should be noted that pipe support members 10, 10', 15 and 15' are four separate but identical elements, and that as regards their respective sizes and contemplated use as being small relative to size of pipes mounted therewith, the pipe support members do not contact each other and are not touching anything nor aligned by any contact with one-another, sole alignment depending upon the locking projections such as 7a, 7b, 7c and 7d mounted within the mounting locking recesses 11a, 11b, 11c, and 11d and the bolts 8a and 8b, and plate-mounted nuts 6a and 6b, in the nut-receiving holes (recesses) 10a, 10b, 10c, and 10d. When the bolts 8a and 8b tighten the vise plates 5a and 5b together compressingly, the mounted pipe's outer surfaces press against the arcuate curved surfaces 13a, 13b, 13c and 13d thus pressing the members 10, 10', 15, and 15' more securely into locked, non-pivoting states, as a result of the length axes of the projections and mated recesses extending in a direction substantially parallel to the length axis of the holes (recesses) 10a, 10b, etc., and being substantially upright in direction relative to the surfaces 13a, 13b, etc.

Also, very important as an improvement in ability of the installers to quickly and easily handle the elements when mounting a pipe, the mating projections and holes (recesses) of the vise plates and the adjacent pipe support members are susceptable of being snapped-together—i.e. the support member snaps onto the adjacent mounting vise plate at one end thereof and another support member snaps onto the other opposite end of the same plate, and it does not readily fall-off, being a good and precise fit always as noted-above, whereby the top composite of a plate and two support elements may be easily handled as a unit, and likewise for the other opposing vise plate, its support members are snapped onto it also and handled as a unit. This is very important to the installers, saving much time and effort in the ease of handling.

Accordingly, for different outside diameter pipes, the arcuate curved surfaces 13a, 13b and 13d vary from one pipe diameter to another; otherwise, however, the dimensions of the size of the pipe support membes 10, 10', etc., and the location of the projections and mating recesses, their sizes, etc., remain constant for any and all pipe sizes. This results in great economy and cost savings in manufacture and production, and also in precision fits always, for reasons previously above explained.

While specific dimensions are employed in industry, for purposes of this specification, it is sufficient to state that the preferred dimension is a matter of choice, except that and for the oil industry oil pipes to which this invention is especially directed in the sense of large pipes, the features of this invention have their primary utility. Also, while the invention works equally well for small pipes, the need being fulfilled that previously presented major problems above-noted arise from the supporting of the larger sized pipes, such as in the oil industry, for example.

It is within the scope of the invention to make such variations and modifications and substitution of equivalents as would be apparent to a person of ordinary skill in this art.

I claim:

1. A pipe support element comprising in combination: a pair of vise plates each having spaced-apart bolt holes therethrough at opposite ends from one-another of each vise plate; four pipe support members utilizable between opposing ones of the pair of vise plates in a clamped spaced-apart relationship to one-another with each contributing to support an intermediate pipe therebetween, each of said pipe support members having a bolt-mounting aperture therethrough alignable with one of said bolt holes when positioned between said pair in said clamped spaced-apart relationship, and each of said pipe support members having spaced-away-from each said bolt-mounting aperture a plate-anchor means including at least one of a recess and a projection extending along an axis substantially parallel to said bolt-mounting aperture of a common one of said pipe support members for maintaining the common one in alignment relative to said pipe between said pipe support members in said clamped spaced-apart relationship thereby enabling support of the pipe by the spaced-apart pipe-support members when a bolt is mounted through the aligned bolt-holes and bolt-mounting apertures and tightened to clamp the pipe support members in spaced-apart relationships supportingly against a circumscribing outer-surface of the intermediate pipe, said pair each including adjacent each of the spaced-apart bolt holes, a meshing locking-structure for locking with said plate-anchor means; the spaced-apart bolt-holes in each of said pair being sufficiently distant from one-another such that a pair of the pipe support members mounted on a common-one of said vise plates are spaced-apart and non-contacting with other pipe support members when in said clamped spaced-apart relationship.

2. A pipe support element of claim 1, in which said anchor-means includes at least two of said at-least one of said recess and said projection, arranged in triangular arrangement relative to said bolt-mounting aperture, said at least two being integral with said pipe support member and a matching two of said remaining one being integral with said vise plate.

3. A pipe support element of claim 1, in which a surface of the pipe support member at a location spaced-away from said anchor-means includes a concave arc seatable of said circumscribing outer-surface of the intermediate pipe, such that when the pipe's outer circumscribing face is seated against said surface within the concave arc, the anchor means is locked-in thereby against said vise plate when pressure-clamped by a bolt extending through said bolt-mounting aperture.

4. A pipe support element of claim 3, and three other additional ones of said pipe support member utilizable as quarter-sections around a pipe mountable therebetween, and two of said vise plates each having two spaced-apart bolt-holes therethrough one at each of opposite ends of a common surface thereof and each of the vise plates having an opposite face opposite said common surface, and on said opposite face for each bolt-hole there being in triangular arrangement two meshing structure meshable and lockable with said anchor-means, whereby when said pipe support members are anchored between said two vise plates with the pipe support members mounted in series around a pipe's outer circumscribing surface, said pipe support members are not susceptable to twisting and provide stable support.

5. A pipe support element of claim 4, including a pair of bolts one mountable through opposing ones of the bolt-holes and through opposing ones of said bolt-mounting aperture of said pipe support members such that said vise plates hold securely a pipe mounted by the circumscribing pipe support members.

6. A pipe support element of claim 4, in which said anchor-means for each structure thereof comprises a projection-receiving recess with a face of the pipe support members, and in which meshing structures are projections mateable within a corresponding recess of said anchor-means.

7. A pipe support element of claim 4, in which said anchor-means for each structure thereof comprises a projection on a face of the pipe support members, and in which said meshing structures are recess-structures receivable of said projections.

* * * * *